United States Patent [19]

McCall et al.

[11] 3,735,085
[45] May 22, 1973

[54] CUTTING AND GOUGING TORCH

[75] Inventors: Kenneth E. McCall; Donald H. Reese, both of Lancaster, Ohio

[73] Assignee: Arcair Company, Lancaster, Ohio

[22] Filed: Feb. 11, 1972

[21] Appl. No.: 225,541

[52] U.S. Cl. ................... 219/70, 174/211, 219/138
[51] Int. Cl. .......................... B23k 9/00, B23k 9/28
[58] Field of Search .................... 147/211; 219/70, 219/138, 141; 339/26, 278 C

[56] References Cited

UNITED STATES PATENTS

| | | | |
|---|---|---|---|
| 3,573,419 | 4/1971 | Henderson | 219/70 |
| 1,719,113 | 7/1929 | Holslag | 219/138 |
| 1,732,441 | 10/1929 | Griffiths | 219/138 |
| 2,784,293 | 3/1957 | Adams | 219/70 |
| 1,898,064 | 2/1933 | Ridge | 339/26 |
| 2,468,226 | 4/1949 | Murphy | 339/26 X |
| 2,476,886 | 7/1949 | Miller et al. | 339/278 C X |
| 2,003,196 | 5/1935 | Jackson | 219/138 |

*Primary Examiner*—R. F. Staubly
*Attorney*—James C. Simmons

[57] ABSTRACT

A cutting and gouging torch to be used in the air-carbon arc process. This low current capacity torch is ideally suited for use with electrodes of less than one-quarter inch in diameter and is readily fabricated, has fewer parts, and is relatively inexpensive to manufacture. The torch is characterized in that the members that insulate the operator from the current carrying members serve as the operative members for inserting or removing electrodes from the torch. A further feature of the new torch resides in the nozzle head acting as a valve to control the passage of the air therethrough.

6 Claims, 7 Drawing Figures

PATENTED MAY 22 1973 3,735,085

PATENTED MAY 22 1973 3,735,085
SHEET 2 OF 2
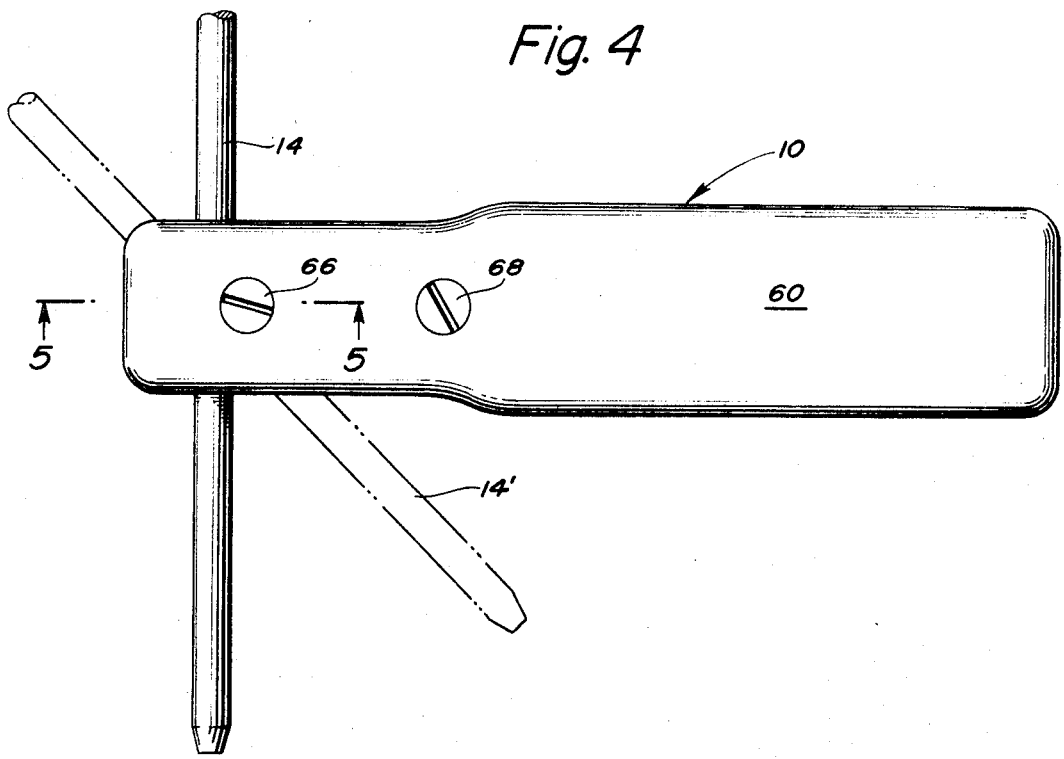
Fig. 4
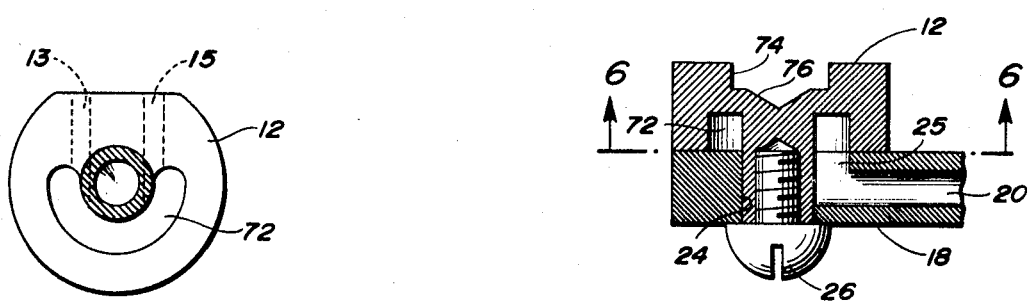
Fig. 6
Fig. 5a
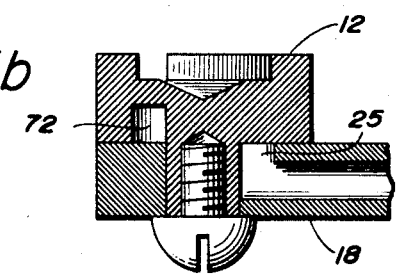
Fig. 5b

CUTTING AND GOUGING TORCH

BACKGROUND OF THE INVENTION

This invention pertains to cutting and gouging torches used in the air-carbon arc cutting and gouging processes. Such torches are commonly used in the foundry for cleaning or preparing castings for repair, removing defects from metals, and preparing metal parts for subsequent welding.

The basic air-carbon arc cutting and gouging torch and method is described in U.S. Pat. No. 2,706,236. A heavy duty improved version of the basic torch is disclosed in U.S. Pat. No. 3,573,419 both of the aforementioned patents having been developed for and owned by the assignee of the present invention.

The torch of the first of the aforementioned United States patents was a distinct advance in the state of the art of metal removal and has become known in the industry as the air-carbon arc cutting method and the torch of the second of the aforementioned patents a distinct advance in the state of the art again. However, both torches are the heavy duty kind, are relatively heavy, bulky, and contain a large number of individual parts which result in the torch being relatively expensive. Such a heavy-duty torch is not necessary for small operators or for ease in handling for inaccessible maintenance work and the like. A lighter-duty torch having fewer parts and hence lower cost and relatively fewer maintenance problems, has been desirable for the small operator and as a tool for the maintenance man, millwright, and the like.

BRIEF DESCRIPTION OF THE INVENTION

In order to provide a low capacity, simplified, and inexpensive air-carbon arc cutting and gouging torch, it has been discovered that the insulating members can be fabricated to serve as the operative members for moving the electrode gripping members to engage the electrode; the electrode head can serve as the operative means for controlling air through the head; the power-cable, air-hose combination can be permanently affixed to the torch body thereby minimizing the total number of pieces required for the torch.

Therefore, it is the primary object of this invention to provide a simplified air-carbon arc cutting and gouging torch.

It is a further object of this invention to provide an air-carbon arc cutting and gouging torch having a minimum number of parts.

It is yet another object of this invention to provide an air-carbon arc cutting and gouging torch that is inexpensive to manufacture.

It is another object of this invention to provide an air-carbon arc cutting and gouging torch employing simplified electrode gripping means.

It is still another object of this invention to provide a simplified welding electrode holder.

BRIEF DESCRIPTION OF THE DRAWING

FIG. 4 is a top view of the torch according to the present invention diagrammatically illustrating positioning of the electrode of control air flow.

FIG. 5a is a partial longitudinal section taken along line 5—5 of FIG. 4 illustrating air flow through the head.

FIG. 5b is a partial longitudinal section taken along line 5—5 of FIG. 4 illustrating no air flow through the head.

FIG. 6 is a bottom view taken along line 6—6 of FIG. 5a of the head of the torch according to the present invention.

DETAILED DESCRIPTION OF THE INVENTION

Figure 1:
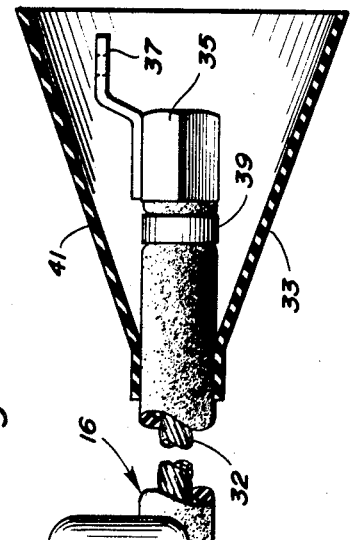
FIG. 1 is a front elevational view of a torch according to the present invention.
Figure 2:
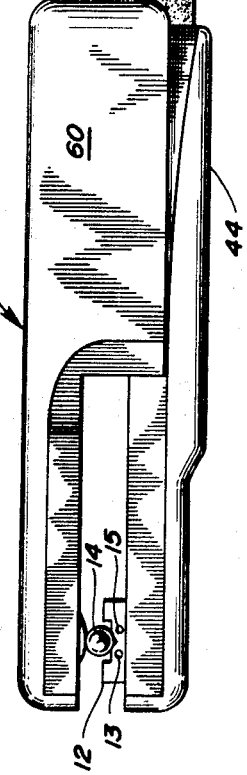
FIG. 2 is an end view of the torch according to the present invention.
Figure 3:
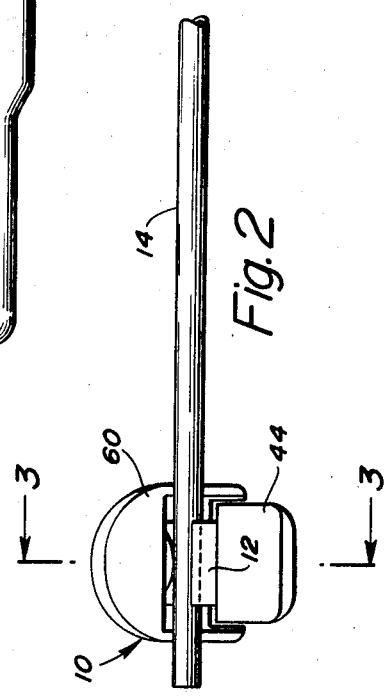
FIG. 3 is a longitudinal section of the torch taken along the line 3—3 of FIG. 2.
Figure 3:
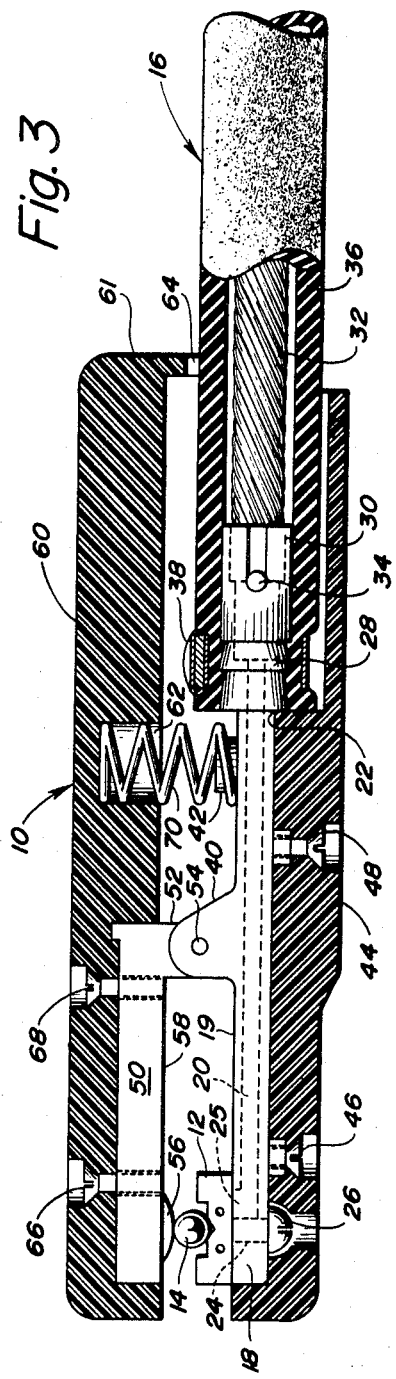

Referring to the drawing there is shown in FIG. 1 an improved lightweight cutting and gouging torch 10 having an electrode supporting head 12 for supporting an electrode 14. The torch has affixed on one end a cable 16 for carrying current and air or other fluid to the head 12 as will hereinafter be more fully explained.

The torch 10 has a main torch body 18 of an electrically conducting material having an longitudinal passage 20 extending from the cable end 22 to a vertical bore 24 through the torch body 18 near the electrode end of the torch. On the inward side and adjacent bore 24, is a vertical aperature 25 extending from the upper surface 19 of torch body 18 to the longitudinal passage 20. The vertical bore 24 is sized to receive the depending stem of the head 12 as shown in FIG. 5a. The head 12 is rotatably secured to torch body 18 by a suitable fastener such as screw 26. On the cable end 22 of torch body 18 there is provided a hollow barbed hose connecting fitting 28 which has a generally hollow cylindrical projection 30 for receiving an electrical conduit 32 carried inside cable 16. The cylindrical projection 30 includes a transverse aperture 34 for admitting air or other fluid carried between the cable covering 36 and conduit 32 to the interior of fitting 28 and thence to the passage 20 in torch body 18 and into vertical bore 24 and finally into the head 12 and out through ports 13, 15 along electrode 14 as is well known to be the operative method in the air-carbon arc cutting and gouging process. Conduit 32 is preferably a copper clad aluminum wire or series or braided copper clad aluminum wires.

The entire cable assembly 16 is secured to the torch body 18 by crimping the end of projection 30 around conductor 32 and securing cable covering 36 to barbed fitting 28 as by a hose clamp 38. The hose clamp 38 is preferably of the permanent type, i.e., not removable and reuseable. This construction eliminates expensive fittings thereby leading to the overall objective of a lightweight inexpensive, relatively maintenance-free torch.

Another feature of the torch that aids in achieving the desired objects of the invention is shown by the construction of cable 16 at the end 33 that is connected to the source of high pressure air and electrical current. The conductor 32 is permanently fixed to an internally threaded hollow lug 35 which contains a strap 37 for connection to the power source (current supply). The internal threaded portion (not shown) of lug 35 is suitable for fluid-tight connection to a source of air under pressure such as an air line, compressor, or the like. The covering 36 is secured to the hollow-barbed projection (not shown) by a clamp 39, similar to clamp 38, and is of the permanent type. The end 33 of cable 16 is provided with an insulating cover or boot 41 that protects the operator from touching the lug 35 when it is affixed to the power supply and the current is on. A boot such as 41 is normally of an elastomeric material, such as rubber, and is constructed so that it engages the cable covering 36 snuggly; however, it is not fastened thereto so that it can be moved along the cable 16 to exposed the lug 35 and facilitate connecting the lug to the air and current sources.

The torch body 18 has a pivot member 40 and a spring receiving boss 22 on the upper surface 19. The pivot member 40 and boss 42 can be provided in body 18 as by casting or forging therein or may be added on as by welding, etc., the integral body being preferred.

Torch body 18 is covered by an insulator 44 which covers the entire body on all sides except surface 19 and projects rearwardly to cover a portion of the cable assembly 16 beyond the clamp 38. Insulator 44 is affixed to the torch body by screws 46, 48 which have suitable threaded receiving apertures in torch body 18. Thus insulator 44 prevents an operator from contacting the current carrying torch body 18 of the torch and serves as a part of the torch handle.

Pivotally mounted on pivot member 40 is an upper arm 50 having a mating depending pivot member 52, upper arm 50 being affixed to body 18 by a pin 54. The upper arm 50 has an electrode gripping boss 56 depending from the end opposite that of the depending pivot member 52, said boss 56 having a generally spherical shape to facilitate pivoting of electrode 14 by rotating head 12. As with torch body 18, upper arm 50 can be readily fabricated from structural materials such as metals by casting, forging, machining, and the like.

The upper arm 50 is covered on all sides except the depending surface 58 facing surface 19 of body 18 by an insulator 60. The insulator 60 has a recess 62 in vertical alignment with boss 42 on body 18 and extends rearwardly to cover cable assembly 16 to a greater extent that does insulator 44. At the cable end 61 of insulator 60 is a semicircular opening 64, the diameter of which is larger than the outside diameter of cable 16 so that the insulator 60 can be moved toward the cable 16. Insulator 60 is affixed to upper arm 50 by screws 66, 68 in a manner similar to the way insulator 44 is affixed to torch body 18.

Disposed around boss 42 on torch body 18 and extending into recess 62 in insulator 60 is a biasing means 70 which is normally a spring. The biasing means 70 forces the insulator 60 away from the cable 16 about pin 54 thereby forcing the upper arm 50 to grip securely electrode 14 in head 12. As insulator 60 is urged toward cable 16 the electrode 14 is released.

Referring to FIGS. 5a, 5b, and 6, the head 12 is shown as having a semicircular or arcuate groove 72 on the underside, said groove 72 communicating with ports 13 and 15 in the head and aperture 25 in torch body 18. When the groove 72 is over aperture 25, air normally flowing in passage 20 flows into groove 72 of head 12 and outwardly of the head through ports 13 and 15 as shown in FIG. 5a which position also corresponds to the electrode 14 being essentially normal to the longitudinal axis of insulator 60 as shown in FIG. 4. If the electrode is moved to the angular position shown as 14' of FIG. 4, the head is rotated as shown in FIG. 5b so that the groove 72 is not communicating with aperture 25 and hence air flow through the head is stopped. This valve-in-head feature eliminates the need for a separate air valve and consequently provides for reduced cost of the torch. The reduced number of parts as a result of eliminating a separate valve, simplifies the torch and makes it a more universal tool for cutting and gouging by the air-carbon arc process.

The head 12 is shown as having both flat 74 and v-shaped 76 electrode gripping surfaces so as to accommodate round electrodes as shown and flat electrodes as shown in U.S. Pat. No. 3,566,069.

The upper arm 50 and torch body 18 are preferably made from steel by forging and are provided with a copper coating for durability. The insulators 44, 60 are made by any known molding process and are preferably of a glass-filled phenolic resin for greater impact, strength, and heat resistance.

By constructing a torch as described above, there is achieved a lightweight, inexpensive, easy-to-assemble, highly functional torch that employs the insulators as part of the operative mechanism for inserting electrodes or removing them from the torch. Such a construction lends itself to a tool that is suited general purpose metal removal and because of its uncomplicated design lends itself to use as a maintenance tool for removing metal and the like.

The torch 10 described above can be used with either an AC or DC welding power source, such as are known in the welding art, and dry compressed air at about 80 psi; a minimum pressure of 60 psi will be effective to assure good clean surfaces. Because the air-carbon arc process works by melting the metal by an arc between the electrode and the work, and then blowing the metal away with air directed at the molten metal at the point of arcing, proper air pressure is necessary. It is also known that a DC power supply gives somewhat smoother arcing characteristics and overall better performance with the torch.

In operation the booth 41 is moved back along the cable 16 exposing lug 35 which is connected to the air line and power supply. An electrode is then selected according to the approximate size of groove to be made in the workpiece as shown in the following Table I. Groove width is approximate since under normal operating conditions a groove is slightly deeper and wider than the diameter of the electrode used.

TABLE I

| Groove Width (in.) | Electrode Diameter (in.) | Current (Amps) d.c. | a.c. |
|---|---|---|---|
| 3/16 | 5/32 | 100–150 | 200–250 |
| 1/4 | 3/16 | 150–200 | 250–300 |
| 5/16 | 1/4 | 150–350 | 300–400 |
| 7/16 | 3/8 Flat | 250–300 | |

The electrode 14 should be placed in the head 12 so that no more than 6 inches protrudes and that the orifices 13, 15 point toward the arc end of the electrode. If 60 psi air is used, the electrode 14 should protrude no more than 4 inches. The electrical power can be turned on and the heat 12 moved to the on position (FIG. 4). The arc is then struck to the workpiece and the torch moved along the path selected for gouging (grooving). When the electrode 14 is consumed to within 1 or 2 inches of the head 12, it should be readjusted for a 4 or 6 inch protrusion (stick out). If the electrode is moved at about a 35° angle to work at the proper speed, a smooth machine-like cut can be achieved. The torch of the instant invention can be used for metal removal of carbon alloy and stainless steel, cast iron, copper, and nickel alloys by selecting the proper electrode and current type selected according to Table II.

TABLE II

| Material | Electrode | Current |
|---|---|---|
| Carbon Steel | d.c. or a.c. | d.c.* or a.c. |
| Alloy STeel | d.c. or a.c. | d.c.* or a.c. |
| Stainless Steel | d.c. or a.c. | d.c.* or a.c. |
| Cast Iron | a.c. | a.c. |
| Copper | a.c. | a.c. |
| Nickel Alloys | a.c. | a.c. |

*Reverse polarity recommended.

If excess metal is to be removed from a weld crown, old hard surface coatings, or other unwanted metal is to be removed from a workpiece it is advantageous to use a ⅜ inch × 3/16 inch × 12 inches flat electrode with DC current to skim or flush off such unwanted metal. Metal should be removed to a depth of about 3/16 inches per pass holding the electrode at an angle of 45° to 60° to the workpiece in the direction of travel. For light skimming-type removal holding the electrode at an angle of between 60° and 80° to the work results in better control of the operation.

Having thus described our invention, what is desired to be secured by Letters Patent of the United States is set forth in the appended claims.

We claim:

1. A lightweight, inexpensive, easy-to-fabricate cutting and gouging torch for use in the air-carbon arc process comprising:

an elongated metal body having longitudinal top and bottom surfaces and an internal passage extending longitudinally thereof;

means at one end of said body connecting said body to a source of electrical power and a source of air under pressure;

a vertical passage in said body opposite the end having said power and air connections, said vertical passage extending from the upper surface of said body to said longitudinal passage;

a nozzle head having a first generally cylindrical section with electrode gripping means therein, a second generally cylindrical section of smaller diameter affixed to said cylindrical section, said first and second cylindrical sections having a common longitudinal axis;

an aperture in said body adjacent said vertical passage for receiving said head and holding said head in pivotal relationship to said body;

said head being adapted to support an electrode with its axis aligned in a predetermined direction transversely of said head;

said head containing an internal passage communicating with said vertical passage in said body;

said head having an upper side wall with at least one orifice from which a stream of air is emitted to pass substantially parallel to said predetermined direction of the axis of an electrode supported by said head;

an upper arm having top and bottom longitudinal surfaces pivotally mounted on said body for maintaining an electrode in gripping engagement with said nozzle head and in a predetermined direction;

a first insulating cover affixed to said body and completely covering all but the longitudinal top surface of said body;

a second insulating cover affixed to said upper arm with means normally biasing said first and second covers toward one another, whereby said first and second covers are the operative means for an operator to change electrodes and support the torch during operation;

said second cover surrounding all but the longitudinal bottom surface of said upper arm and projecting toward and surrounding a portion of said cable and cable connection to prevent contact by an operator with the current carrying body and upper arm of said torch.

2. A torch according to claim 1 wherein said internal passage in said head comprising a semiannular duct encircling the pivot axis of the head.

3. A torch according to claim 1 wherein said head contains an electrode gripping surface to hold round or flat electrodes.

4. A torch assembly wherein a torch according to claim 1 includes means connecting the body to the source of power and source of air under pressure comprising a cable having an electrical conductor surrounded by an insulating covering with an air space therebetween, said cable being affixed to the torch body on one end and on the other end having a lug for connection to the air and current sources, said lug covered by a movable insulating boot.

5. A torch according to claim 1 wherein the body and upper arm are of forged steel covered by a layer of copper.

6. A lightweight, inexpensive, easy-to-fabricate cutting and gouging torch for use in the air-carbon arc process comprising in combination:

an elongated metal body having longitudinal top and bottom surfaces and an internal passage extending longitudinally thereof;

affixed to one of said body a cable having an electrical conductor therein and an air passage therein so that said cable air passage communicates with said passage in said body;

said cable having on its non-fixed end means for connection to a source of electrical power and a source of air under pressure, said end having a movable electrically insulating cover over said connections;

a vertical passage in said body opposite the end having said cable connection, said vertical passage extending from the upper surface of said body to said longitudinal passage;

a nozzle head having a first generally cylindrical section with electrode gripping means therein, a second generally cylindrical section of smaller diameter affixed to said cylindrical section, said first and second cylindrical sections having a common longitudinal axis;

an aperture in said body adjacent said vertical passage for receiving said head holding said head in pivotal relationship to said body;

said head being adapted to support an electrode with its axis aligned in a predetermined direction transversely of said head;

said head containing an internal passage in the shape of a semiannular duct encircling the pivot axis of the head, communicating with said vertical passage in said body, said internal passage being so shaped to control air flow from said body to said head by rotation of said head about the vertical axis;

said head having an upper side wall with at least one orifice from which a stream of air is emitted to pass substantially parallel to said predetermined direction of the axis of an electrode supported by said head;

an upper arm having longitudinal top and bottom surfaces pivotally mounted on said body for maintaining an electrode in gripping engagement with said nozzle head and in a predetermined direction;

a first insulating cover affixed to said body and completely covering all but the longitudinal top surface of said body;

a second insulating cover affixed to said upper arm with means normally biasing said first and second covers toward one another; whereby said first and second covers are the operative means for an operator to change electrodes and support the torch during operation;

said second cover surrounding all but the longitudinal bottom surface of said upper arm and projecting toward and surrounding a portion of said cable and cable connection to prevent contact by an operator with the current carrying body and upper arm of said torch.

* * * * *

PO-1050
(5/69)

UNITED STATES PATENT OFFICE
CERTIFICATE OF CORRECTION

Patent No. 3,735,085            Dated May 22, 1973

Inventor(s) Kenneth E. McCall and Donald H. Reese

It is certified that error appears in the above-identified patent and that said Letters Patent are hereby corrected as shown below:

In the Specification:

Column 2, line 3, the word "of", second occurrence, should read --to--;

Column 2, line 44, the word "or", second occurrence, should read --of--;

Column 2, line 66, the word "the" should read --a--;

Column 3, line 39, the word "that" should read --than--;

Column 4, line 21, after the word "suited" and before the word "general" insert the word --for--;

Column 4, Table I, line 5, under Current (Amps) d.c., "150-350" should read --250-350--.

In the Claims:

Column 6, line 12, "comprising" should read --comprises--;

Column 6, line 15, after the word "surface" and before the word "to" insert the word --adapted--;

Column 6, line 35, after the word "one" and before the word "of" insert the word --end--.

Signed and sealed this 9th day of July 1974.

(SEAL)
Attest:

McCOY M. GIBSON, JR.
Attesting Officer

C. MARSHALL DANN
Commissioner of Patents